US012762945B2

(12) United States Patent
Patel

(10) Patent No.: US 12,762,945 B2
(45) Date of Patent: Oct. 13, 2026

(54) LIGHT EMITTER DRIVER CIRCUIT FOR SMOKE DETECTOR

(71) Applicant: KIDDE FIRE PROTECTION, LLC, Bradenton, FL (US)

(72) Inventor: Vipul Patel, Sarasota, FL (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 513 days.

(21) Appl. No.: 18/447,594

(22) Filed: Aug. 10, 2023

(65) Prior Publication Data

US 2024/0078896 A1 Mar. 7, 2024

Related U.S. Application Data

(60) Provisional application No. 63/371,659, filed on Aug. 17, 2022.

(51) Int. Cl.

*G08B 29/24* (2006.01)
*G08B 17/103* (2006.01)
*H05B 47/14* (2020.01)

(52) U.S. Cl.

CPC ........... *G08B 29/24* (2013.01); *G08B 17/103* (2013.01); *H05B 47/14* (2020.01)

(58) Field of Classification Search

CPC .... G08B 17/107; G08B 17/10; G08B 17/113; G08B 17/11; G08B 29/181; G08B 17/06; G08B 17/103; G08B 17/117; G08B 29/145; G08B 25/10; G08B 29/043; G08B 29/185; G08B 29/24; G08B 7/06; G08B 7/064; G08B 1/00; G08B 3/00; G08B 5/00; G08B 6/00; G08B 7/00; G08B 9/00;

(Continued)

(56) References Cited

U.S. PATENT DOCUMENTS 4,300,133 A * 11/1981 Solomon ............. G08B 17/103 340/630
4,688,021 A * 8/1987 Buck ...................... G08B 17/11 340/521

(Continued)

FOREIGN PATENT DOCUMENTS

CN 2319868 Y 5/1999
CN 204883456 U 12/2015

(Continued)

*Primary Examiner* — Daniel Previl
(74) *Attorney, Agent, or Firm* — CANTOR COLBURN LLP

(57) ABSTRACT

A driver circuit and a method of supplying a constant current to the light emitter of the smoke detector are disclosed. The driver circuit includes a transistor, and a controller. The collector terminal of the transistor is connected to the light emitter and a resistor is connected to the emitter terminal. During the manufacturing stage, the controller monitors and stores the values of first base voltage to be supplied to the base terminal to supply a constant current to the light emitter, and first resistor voltage across the resistor when the first base voltage is supplied to the base terminal. Before each smoke detection process, the controller processes the stored data and adjusts the base voltage to be supplied to the base terminal to enable the transistor to supply the constant current to the light emitter, regardless of the temperature around the smoke detector.

20 Claims, 5 Drawing Sheets

(58) Field of Classification Search
CPC ........ G08B 13/00; G08B 15/00; G08B 17/00; G08B 19/00; G08B 21/00; G08B 23/00; G08B 25/00; G08B 26/00; G08B 27/00; G08B 29/00; G08B 31/00; G08B 21/02; G08B 21/0423; G08B 21/0446; G08B 21/0453; G08B 21/0461; G08B 21/0476; G08B 21/0484; G08B 21/0492; G08B 25/016; A62C 2/06; A62C 2/00; A62C 3/00; A62C 4/00; A62C 5/00; A62C 8/00; A62C 11/00; A62C 13/00; A62C 15/00; A62C 17/00; A62C 19/00; A62C 25/00; G01K 3/005; G01K 1/00; G01K 3/00; G01K 5/00; G01K 7/00; G01K 9/00; G01K 11/00; G01K 13/00; G01K 15/00; G01K 17/00; G01K 19/00; G01K 2201/00; G01K 2203/00; G01K 2205/00; G01N 21/0303; G01N 21/53; G01N 21/552; G01N 21/59; G01N 21/94; G01N 21/954; G01N 2201/022; G01N 2201/068; G01N 27/122; G01N 1/00; G01N 3/00; G01N 5/00; G01N 7/00; G01N 9/00; G01N 11/00; G01N 13/00; G01N 15/00; G01N 17/00; G01N 19/00; G01N 21/00; G01N 22/00; G01N 23/00; G02B 6/102; G02B 1/00; G02B 3/00; G02B 5/00; G02B 6/00; G02B 7/00; G02B 9/00; G02B 13/00; G02B 15/00; H02H 3/02; H02H 1/00; H02H 3/00; H02H 5/00; H02H 6/00; H02H 7/00; H02H 9/00; H02H 11/00; H02H 99/00; H02J 9/068; H02J 1/00; H02J 3/00; H02J 4/00; H02J 7/00; H02J 9/00; H02J 11/00; H02J 13/00; H02J 15/00; H02J 50/00; H02J 2101/00; H02J 2103/00; H02J 2105/00; H02J 2107/00; H02J 2207/00; H05B 47/14; H05B 1/00; H05B 3/00; H05B 6/00; H05B 7/00; H05B 11/00; H05B 31/00; H05B 33/00; H05B 35/00; H05B 39/00; H05B 41/00; H05B 44/00; H05B 45/00; H05B 46/00; H05B 47/00; H05B 2203/00; H05B 2206/00; H05B 45/20; H05B 45/24; H05B 45/37; H05B 45/40; H05B 47/105; H05B 47/11; H05B 47/16; H05B 47/185; H05B 47/1965; Y02E 60/10; Y02E 10/00; Y02E 20/00; Y02E 30/00; Y02E 40/00; Y02E 50/00; A43B 3/42; A43B 3/46; A43B 3/48; A43B 1/00; A43B 3/00; A43B 5/00; A43B 7/00; A43B 9/00; A43B 11/00; A43B 13/00; A43B 15/00; A43B 17/00; A43B 21/00; A43B 19/00; A43B 23/00; A61B 2562/0219; A61B 5/0006; A61B 5/0008; A61B 5/0013; A61B 5/002; A61B 5/0022; A61B 5/0077; A61B 5/01; A61B 5/02055; A61B 5/0261; A61B 5/053; A61B 5/1112; A61B 5/1116; A61B 5/1117; A61B 5/1118; A61B 5/384; A61B 5/395; A61B 5/6803; A61B 5/6806; A61B 5/6807; A61B 5/681; A61B 5/6824; A61B 5/6826; A61B 5/6891; A61B 5/7264; A61B 7/00; A61B 7/04; A61B 7/045; A61B 8/00; A61B 8/06; A61B 8/0808; A61B 8/4427; A61B 8/488; A61B 8/565; A61B 1/00; A61B 3/00; A61B 5/00; A61B 6/00; A61B 9/00; A61B 10/00; A61B 13/00; A61B 16/00; A61B 17/00; A61B 18/00; F21K 9/23; F21K 9/27; F21K 2/00; F21K 5/00; F21K 9/00; F21K 99/00; F21V 23/04; F21V 23/0471; F21V 1/00; F21V 3/00; F21V 5/00; F21V 7/00; F21V 9/00; F21V 11/00; F21V 13/00; F21V 14/00; F21V 15/00; F21V 17/00; F21V 19/00; F21V 21/00; F21V 23/00; F21V 25/00; F21V 29/00; F21V 27/00; F21V 31/00; F21V 33/00; F21Y 2105/00; F21Y 2115/10; G16H 15/00; G16H 20/13; G16H 20/30; G16H 40/67; G16H 50/20; G16H 80/00; G16Z 99/00; H04M 2250/12; H04M 3/5116; H04W 84/18; Y02B 20/30; Y02B 20/40; Y02B 10/00; Y02B 20/00; Y02B 30/00; Y02B 40/00; Y02B 50/00; Y02B 70/00; Y02B 80/00; Y02B 90/00
USPC ..... 340/628, 520, 521, 525, 538.14, 539.22, 340/539.26, 539.27, 632, 636.12, 636.13, 340/636.18, 660, 687
See application file for complete search history.

(56) References Cited

U.S. PATENT DOCUMENTS 5,670,948 A * 9/1997 Mochizuki ........... G08B 17/107 340/630
5,705,979 A 1/1998 Fierro et al.
6,426,703 B1 7/2002 Johnston et al.
7,514,987 B2 4/2009 Lin
7,518,437 B2 4/2009 Yamasaki
7,589,513 B2 9/2009 Ogiwara et al.
7,679,353 B2 3/2010 Noda
7,880,534 B2 2/2011 Huang et al.
8,363,046 B2 1/2013 Miyazaki
8,680,840 B2 3/2014 Iacob et al.
8,797,531 B2 8/2014 Knox et al.
8,804,119 B2 8/2014 Knox et al.
8,866,083 B2 10/2014 Brigham et al.
9,448,575 B2 9/2016 Mai et al.
9,622,301 B2 4/2017 Warren et al.
9,715,982 B2 7/2017 Lv et al.
9,767,665 B2 9/2017 Allemann et al.
10,001,793 B2 6/2018 Chu et al.
10,073,477 B2 9/2018 Chu
10,606,292 B1 3/2020 Lai
10,638,563 B2 4/2020 Bretzer et al.
11,209,854 B2 12/2021 Zhou et al.
11,302,166 B2 4/2022 Patel
11,343,895 B2 5/2022 Willis et al.
2004/0124227 A1* 7/2004 Seki ..................... B23K 31/125 228/103
2010/0026379 A1* 2/2010 Simard ................... H02M 7/04 327/540
2012/0228506 A1* 9/2012 Honda ...................... G01J 5/20 250/338.4
2014/0111343 A1* 4/2014 Kim ....................... G08B 17/06 340/628
2021/0211044 A1 7/2021 Nakatani
2024/0022060 A1* 1/2024 Naik .................... H02H 11/003

FOREIGN PATENT DOCUMENTS

CN 106647923 B 1/2019
CN 111179540 A 5/2020
DE 2442017 C3 2/1981
KR 100973476 B1 8/2010

* cited by examiner

LIGHT EMITTER DRIVER CIRCUIT FOR SMOKE DETECTOR

CROSS-REFERENCE TO RELATED APPLICATION

This patent application claims the benefit of priority of US Provisional Patent Application No. 63/371,659, filed on Aug. 17, 2022.

TECHNICAL FIELD

This invention relates to the field of smoke detectors, and more particularly, to a driver circuit for smoke detectors.

BACKGROUND

Smoke detectors are generally subjected to wide temperature swings and are required to perform consistently and accurately without having any false alarms or going into a non-operative/trouble state. Photoelectric smoke detectors are widely used smoke detectors that typically include a driver circuit that is required to supply constant current to the light emitter of the smoke detector, regardless of the temperature around the smoke detector, such that the photon count or smoke count detected by the light receiver of the smoke detector does not vary with varying temperature. However, the driver circuits involve semiconductor devices that may generally be affected by varying temperatures. As a result, the driver circuits may fail to provide a constant current to the light emitter. For instance, at higher temperatures, the driver circuit may supply a higher current to the light emitter which may increase the photon count, leading to false alarm generation by the smoke detector. Similarly, at lower temperatures, the driver circuit may supply less current to the light emitter which may decrease the photon count, thereby causing the smoke detector to go into a non-operative or troubled state.

There is, therefore, a need to compensate for the effect of temperature on the driver circuit and enable the driver circuit to supply constant current to the light emitter of the smoke detector, independent of the temperature around the smoke detector.

BRIEF SUMMARY

In some embodiments, a driver circuit for a light emitter of a smoke detector is disclosed. The driver circuit comprises a transistor. The transistor comprises a base terminal, a collector terminal, and an emitter terminal. The collector terminal of the transistor is adapted to be operatively connected to the light emitter of the smoke detector. The driver further comprises a resistor of a predefined resistance configured to be connected to the emitter terminal of the transistor; and a controller operatively configured at the base terminal. The controller is configured to determine, at a manufacturing stage of the driver circuit, a first base voltage to be supplied to the base terminal of the transistor to enable the transistor to supply a predefined current to the light emitter, and further determine, at the manufacturing stage, a first resistor voltage across the resistor when the first base voltage is supplied to the base terminal. The controller is configured to set, before each smoke detection process, a value of the base voltage supplied to the base terminal to the first base voltage, determine a second resistor voltage across the resistor, compare the first resistor voltage with the second resistor voltage, determine a difference between the first resistor voltage and the second resistor voltage based on the comparison, and adjust the value of the base voltage supplied to the base terminal based on the determined difference to enable the transistor to supply the predefined current to the light emitter.

In addition to one or more of the features described above, or as an alternative, in some embodiments, the predefined current corresponds to a constant current to be supplied to the light emitter at a predefined temperature.

In addition to one or more of the features described above, or as an alternative, in some embodiments, the predefined temperature is room temperature.

In addition to one or more of the features described above, or as an alternative, in some embodiments, the transistor is a Darlington pair transistor or single transistor.

In addition to one or more of the features described above, or as an alternative, in some embodiments, the controller is configured to determine a temperature at an area of interest (AOI) where the driver circuit or the smoke detector is installed based on one or more of the second resistor voltage across the resistor, the adjusted base voltage to be supplied to the base terminal to supply the predefined current to the light emitter, and the predefined resistance of the resistor.

In addition to one or more of the features described above, or as an alternative, in some embodiments, the controller of the driver circuit is a computing unit of the smoke detector, wherein the smoke detector comprises the light emitter and a light receiver.

In addition to one or more of the features described above, or as an alternative, in some embodiments, the controller of the driver circuit is different from a computing unit of the smoke detector, and wherein the controller of the driver circuit is in communication with a computing unit of the smoke detector.

In addition to one or more of the features described above, or as an alternative, in some embodiments, the controller comprises an analog to digital converter (ADC) to monitor voltage across the resistor; and a digital to analog converter (DAC) to supply an analog voltage to the base terminal of the transistor.

In addition to one or more of the features described above, or as an alternative, in some embodiments, the controller comprises a processor, and a memory coupled to the processor and configured to store the values of the first voltage and the second voltage.

According to another exemplary embodiment, a smoke detection and alarm device is disclosed. The device comprises a light emitter and a light receiver. The device further comprises a driver circuit comprising a transistor having a base terminal, a collector terminal, and an emitter terminal wherein the collector terminal of the transistor is operatively connected to the light emitter; a resistor of a predefined resistance configured to be connected to the emitter terminal of the transistor; and a controller operatively configured at the base terminal. The controller is configured to set, before an individual smoke detection process, a base voltage supplied to the base terminal to a predetermined base voltage value; determine a resistor voltage across the resistor; compare the determined resistor voltage to a predetermined resistor voltage value; and adjust the base voltage supplied to the base terminal based on the comparison.

In addition to one or more of the features described above, or as an alternative, in some embodiments, the predetermined base voltage value is configured to enable the transistor to supply a constant current to the light emitter at room temperature, and the predetermined resistor voltage is the voltage across the resistor when the predetermined base voltage value is supplied to the base terminal.

In addition to one or more of the features described above, or as an alternative, in some embodiments, the light emitter and the light receiver are enclosed within a hollow enclosure having a smoke chamber that is adapted to receive smoke therewithin.

In addition to one or more of the features described above, or as an alternative, in some embodiments, the controller is configured to enable the transistor to supply the predefined current to the light emitter to enable the light emitter to emit photons within the smoke chamber to detect smoke within the smoke chamber based on a count of photons received by the light receiver upon getting reflected from particles of the smoke within the smoke chamber.

In addition to one or more of the features described above, or as an alternative, in some embodiments, the controller is configured to generate alarm signals when the count of reflected photons within the smoke chamber exceeds a predefined value.

In addition to one or more of the features described above, or as an alternative, in some embodiments, the device is adapted to be installed in one or more areas of interest (AOI) comprising one or more of an HVAC duct, room, hall, staircase, vehicle interior, and storage space.

According to yet another embodiment, a method for supplying a constant current to a light emitter of a smoke detector is disclosed. The method includes the steps of connecting a collector terminal of a transistor to the light emitter of the smoke detector, a resistor of a predefined resistance to the emitter terminal of the transistor, and a controller at the base terminal. Further, at the manufacturing stage, the method includes a step determining, a first base voltage to be supplied to the base terminal of the transistor to enable the transistor to supply a predefined current to the light emitter, followed by another step of determining a first resistor voltage across the resistor when the first base voltage is supplied to the base terminal. Further, before each smoke detection process, the method includes the step of setting a value of the base voltage supplied to the base terminal to the first voltage, followed by the steps of determining a second resistor voltage across the resistor, comparing the first resistor voltage with the second voltage, and a difference between the first resistor voltage and the second resistor voltage based on the comparison. Accordingly, based on the determined difference, the method includes the step of adjusting the base voltage supplied to the base terminal to enable the transistor to supply the predefined current to the light emitter.

In addition to one or more of the features described above, or as an alternative, further embodiments of the device may include where the method comprises the step of determining a temperature at an area of interest (AOI) where the driver circuit or the smoke detector is installed, based on one or more of the second resistor voltage across the resistor, the adjusted base voltage to be supplied to the base terminal to supply the predefined current to the light emitter, and the predefined resistance of the resistor.

In addition to one or more of the features described above, or as an alternative, in some embodiments, the difference between the first resistor voltage and the second resistor voltage is zero, the method comprises the step of supplying the first base voltage to the base terminal of the transistor.

In addition to one or more of the features described above, or as an alternative, in some embodiments, the difference between the first resistor voltage and the second resistor voltage is positive, and the method comprises the steps of computing, by the controller, a first compensation value that corresponds to the difference between the first resistor voltage and the second resistor voltage, divided by a first correction factor ranging from 0.1 to 16; adjusting, by the controller, the base voltage to be supplied to the base terminal to a value equal to a sum of the first base voltage and the first compensation value; and supplying, by the controller, the adjusted base voltage to the base terminal.

In addition to one or more of the features described above, or as an alternative, in some embodiments, the difference between the first resistor voltage and the second resistor voltage is negative, and the method comprises the steps of computing, by the controller, a second compensation value that corresponds to the difference between the second resistor voltage and the first resistor voltage, divided by a second correction factor ranging from 0.1 to 16, adjusting the base voltage to be supplied to the base terminal to a value equal to a difference between the first base voltage and the second compensation value, and supplying, by the controller, the adjusted base voltage to the base terminal.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

Figure 1:
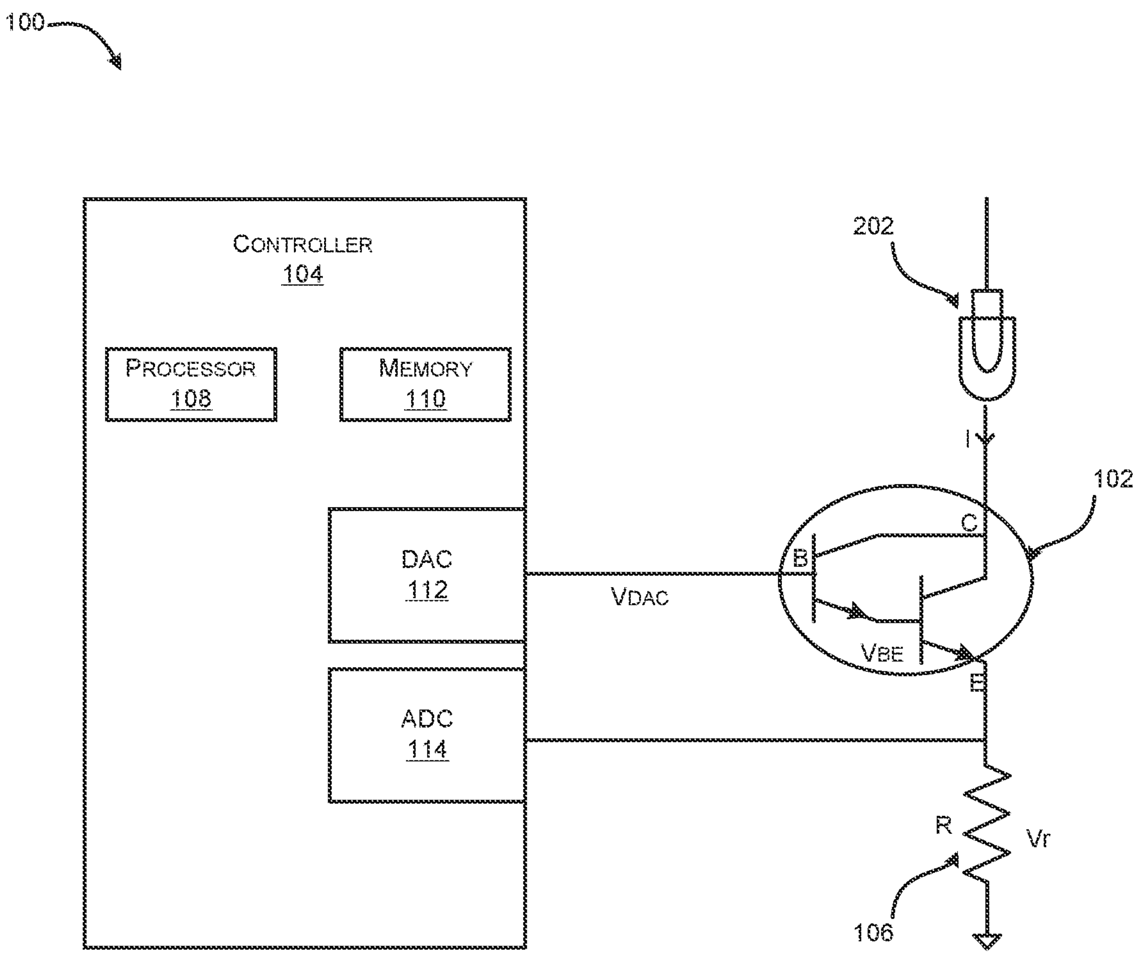
FIG. 1 is a schematic diagram illustrating an exemplary the driver circuit in accordance with one or more embodiments.

Referring to FIG. 1, an exemplary view of a driver circuit 100 for a light emitter 202 of a smoke detector 200 according to one or more embodiments. The driver circuit 100 described herein may compensate for the effect of temperature on the driver circuit 100 and supplies a constant current to a light emitter 202 of the smoke detector 200, independent of the temperature around the smoke detector 200. The driver circuit 100 includes a transistor 102 having a base terminal (B), a collector terminal (C), and an emitter terminal (E). The transistor 102 acts like a switch for the light emitter 202, which can be a normal transistor or a Darlington pair transistor. The collector terminal of transistor 102 is adapted to be operatively connected to the light emitter 202 of the smoke detector. Further, a resistor 106 of a predefined resistance (R) is connected to the emitter terminal of transistor 102. The resistor 106 limits the amount of current flowing through the light emitter 202. The driver circuit 100 includes a controller 104 operatively configured at the base terminal of the transistor 102.

It should be obvious to a person skilled in the art that the light emitter current (I) depends on voltage drop (Vr) across the resistor 106, where the voltage drop (Vr) across the resistor 106 is equal to a difference in the base voltage (Vdac) supplied to the base terminal and the voltage drop (base-emitter voltage Vbe) across the transistor 102.

Voltage drop across the resistor 106, $Vr=(Vdac-Vbe)$

Light emitter current, $I=(Vr/R)$

Figure 5:
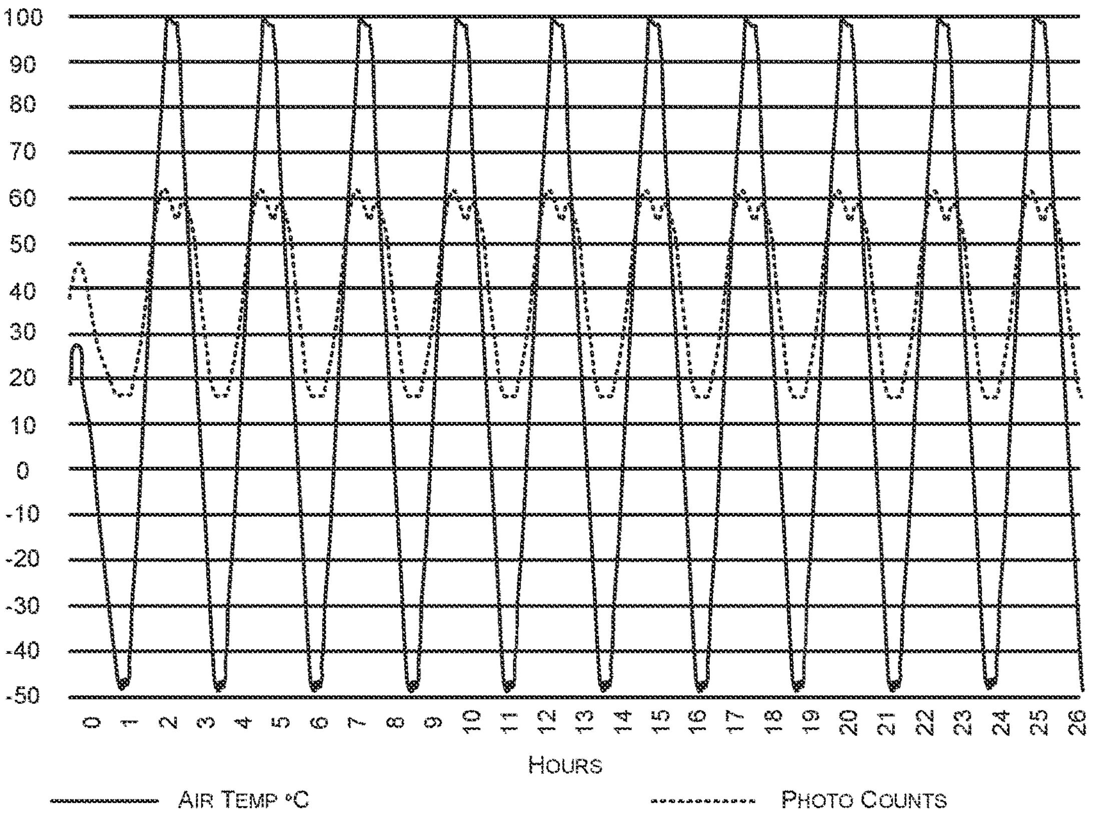
FIG. 5 (Prior Art)
FIG. 5 is a schematic diagram illustrating the effect of temperature on the light emitter current in existing smoke detectors in 24 hours, in accordance with one or more embodiments.
Figure 6:
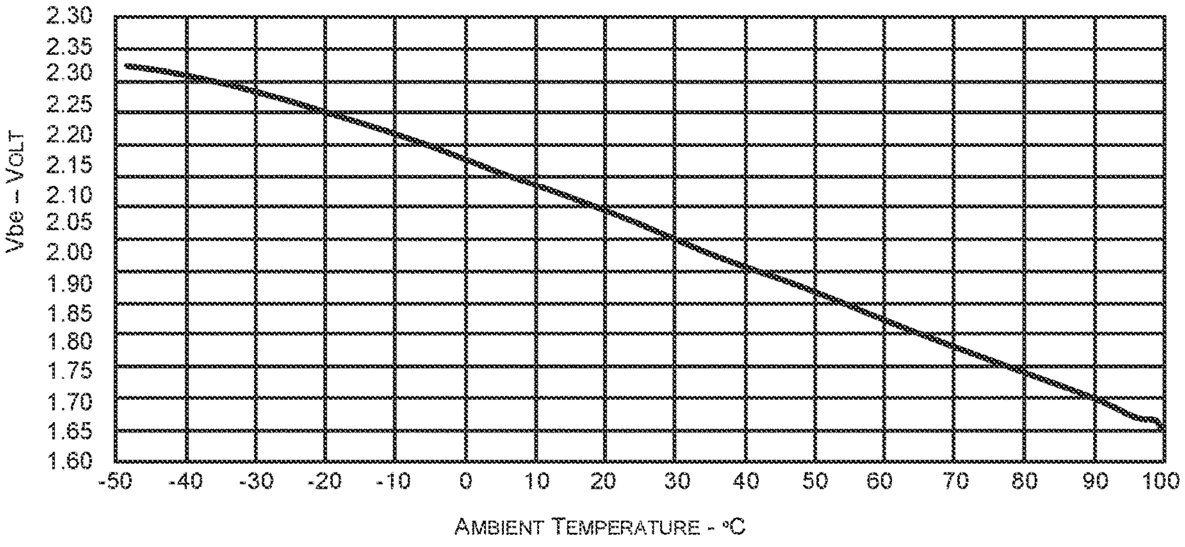
FIG. 6 (PRIOR ART)
FIG. 6 is a schematic diagram illustrating the effect of temperature on the base-emitter voltage (Vbe) of transistor, in accordance with one or more embodiments.

Theoretically, by controlling Vdac, the light emitter current can be controlled to maintain a constant current value. However, practically, a transistor involving semiconductors has a unique characteristic that its Vbe is highly dependent on temperature as shown in FIG. 6. Thus, as temperature increases, the Vbe decreases and vice versa. As a result, in the existing smoke detectors, upon variation of temperature, the light emitter current also varies, which leads to variation in photon counts in the existing smoke detectors. For instance, as already explained in the Background of this disclosure, at higher temperatures, the existing driver circuit may normally supply a higher current to the light emitter which may increase the photon count, thereby causing the smoke detector to mistakenly generate a false alarm. Further, at lower temperatures, the existing driver circuit may normally supply a low current to the light emitter which may decrease the photon count, thereby causing the smoke detector to go into a non-operative or trouble state. This fluctuation in light emitter current is highly undesirable in smoke detectors. The effect of temperature on the light emitter current in existing smoke detectors in 24 hours is shown in FIG. 5, which also suggests that the current supplied to the light emitter varies with varying temperatures. Further, the effect of temperature on light photon count in existing smoke detectors is shown in FIG. 6, which suggests that the photon count emitted by the light emitter also varies with varying temperatures.

To overcome the above light emitter current fluctuation issue or photon count fluctuation issue due to varying temperatures in existing smoke detectors, this invention involves a temperature compensation technique without the requirement of any temperature sensors. This invention compensates for the effect of temperature on the smoke detector by configuring/programming the driver circuit 100 in such a way that the driver circuit 100 supplies a constant current to the light emitter 202 of the smoke detector 200, regardless of the temperature around the smoke detector 200 or driver circuit 100.

During the manufacturing stage, controller 104 of the driver circuit monitors and stores the values of voltage (say a first base voltage) to be supplied to the base terminal of the transistor 102 to supply a constant current to the light emitter 202, and also monitors the voltage (say a first resistor voltage) across the resistor 106 when the first base voltage is supplied to the base terminal. Further, before each smoke detection process, controller 104 uses the data stored during the manufacturing stage and accordingly adjusts the base voltage to be supplied to the base terminal to enable transistor 102 to supply the constant current to the light emitter 202, regardless of the temperature around the smoke detector 200.

Figure 2A:
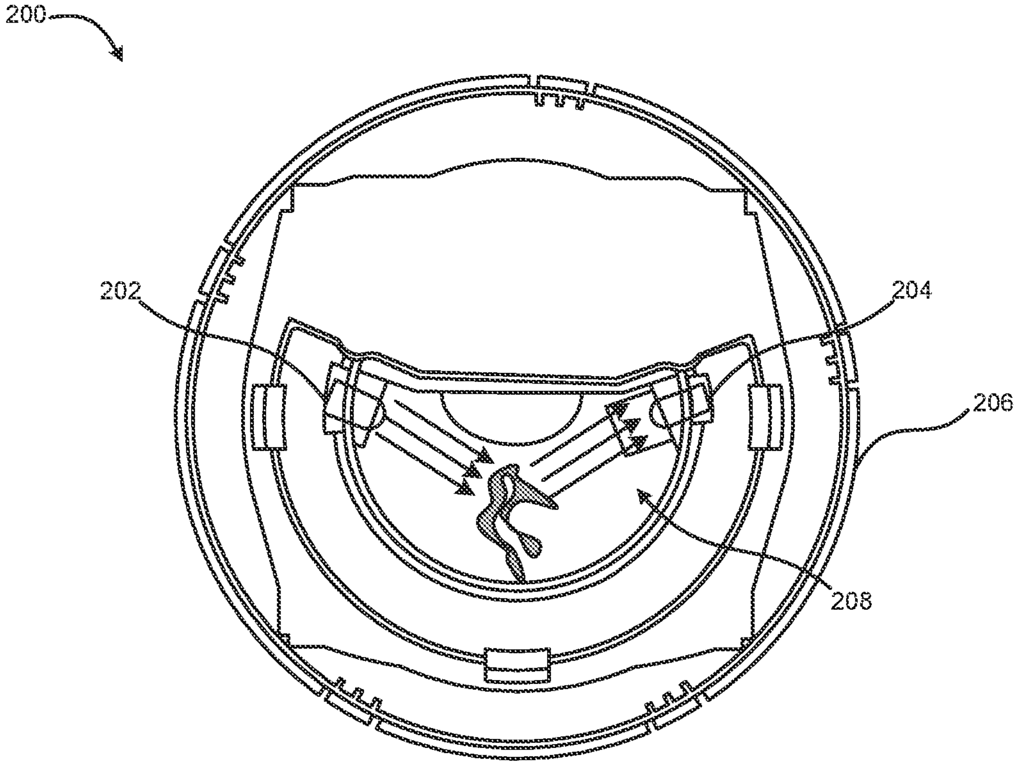
FIG. 2A is a schematic diagram illustrating an exemplary smoke detection and alarm device in accordance with one or more embodiments.
Figure 2B:
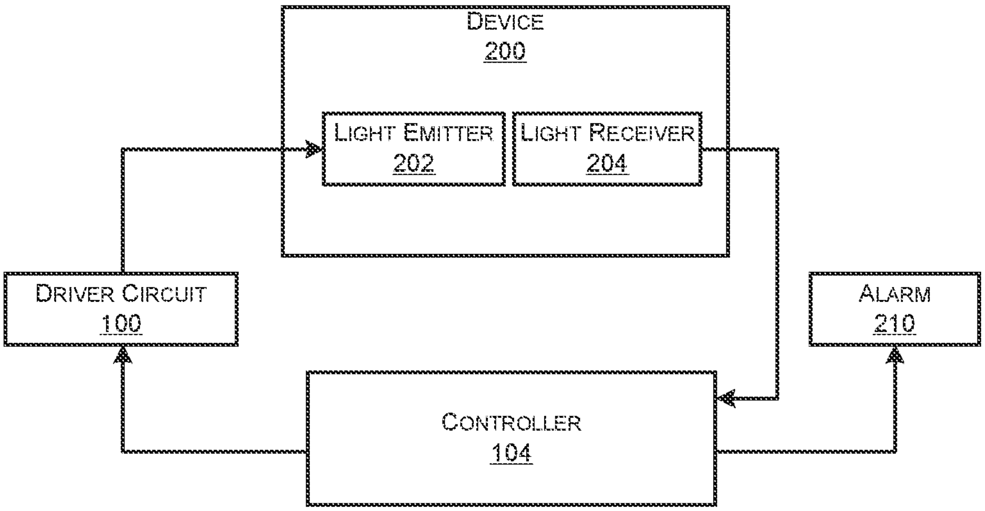
FIG. 2B is a block diagram illustrating an exemplary the smoke detection and alarm device in accordance with one or more embodiments.

Referring to FIGS. 2A and 2B, exemplary views of representation of smoke detection and alarm device 200 (also referred to as smoke detector 200 or device 200, herein) employing the driver circuit 100 of FIG. 1 is illustrated. The device 200 or smoke detector 200 includes the light emitter 202 and a light receiver 204 enclosed within a hollow enclosure/housing 206 having a smoke chamber 208 therewithin that is adapted to receive smoke from the area where the device 200 is installed. The light emitter 202 includes one or more of a LED, a laser light source, or an infra light source, and other known light emitting sources that are generally used as a light emitter in existing smoke detectors. Further, the light receiver 204 is a photodiode or other light sensor that is generally used as light receiver 204*s* in existing smoke detectors. Device 200 further includes the driver circuit 100 of FIG. 1, which includes the transistor 102 having a base terminal (B), a collector terminal (C), and an emitter terminal (E), where the collector terminal of the transistor 102 is operatively connected to the light emitter 202 of the device 200 and the resistor 106 of a predefined resistance is connected to the emitter terminal of the transistor 102. Further, device 200 also includes the controller 104 operatively configured at the base terminal of the transistor 102, which includes an in-built or external ADC 114 to monitor the voltage across the resistor 106, and an in-built or external DAC 112 to supply an analog voltage to the base terminal of the transistor 102.

The device 200 is adapted to be installed in one or more areas of interest (AOIs) comprising one or more of an HVAC duct, room, hall, staircase, vehicle interior, and storage space, but not limited to the like. The smoke detector/device 200 enables the transistor 102 to supply the predefined current to the light emitter 202 continuously, which enables the light emitter 202 to continuously emit a constant count of photons within the smoke chamber 208. When smoke is present or generated in the AOI, a portion of the smoke enters the smoke chamber 208 of the device 200. The particles of the smoke in the smoke chamber 208 generally reflect the photon (emitted by the light emitter 202) towards the light receiver 204. Further, the light receiver 204 receives the reflected photon and enables the controller 104 to determine the count of light reflected by the particles of the smoke and correspondingly determine the amount of smoke in the AOI. In some embodiments, device 200 includes one or more audio, and visual alarms such as LEDs, speakers, buzzers, and the like (collectively designated as 210, herein). The controller 104 is configured to generate alarm signals when the count of reflected photons or amount of smoke within the smoke chamber 208 exceeds a predefined value, which notifies or alerts occupants in the AOI about the smoke.

The controller 104 being used in the driver circuit 100 of FIG. 1 as well as in device 200 of FIGS. 2A and B include a processor 108, and a memory 110 operatively coupled to the processor 108 storing instructions executable by the processor 108 to enable the controller 104 to do one or more operations such as smoke detection, temperature compensation, monitoring of voltages, current, and photon count, voltage supply, and alarm generation. Further, the values of the first base voltage and first resistor voltage collected during the manufacturing stage are also stored in the memory 110, which can be later used by controller 104 to compensate for the effect of temperature on the light emitter current. In some embodiments, the computing unit or controller 104 of the smoke detector/device 200 can be used as the controller 104 for the driver circuit 100. The common controller 104 can control the operation of the driver circuit 100 as well as the smoke detector/device 200. Further, in other embodiments, the controller 104 of the driver circuit 100 can be different from the computing unit of the smoke detector/device 200, however, the controller 104 of the driver circuit 100 remains operatively connected or in communication with the computing unit or controller 104 of the smoke detector/device 200 via known wired or wireless media.

The controller 104, in some embodiments, may include an in-built analog to digital converter (ADC) 114 to monitor the voltage across the resistor 106 and a digital to analog converter (DAC) 112 to supply an analog voltage to the base terminal of the transistor 102. The ADC 114 of the controller 104 remains operatively connected across the resistor 106. Further, the DAC 112 of controller 104 remains operatively connected to the base terminal of transistor 102. However, in some embodiments, the ADC 114 and DAC 112 can be external components that can be connected to a processor 108 associated with the controller 104, and all such embodiments are well within the scope of this invention. In other embodiments, the ADC 114 may be replaced by a voltage sensor that can monitor the voltage across the resistor 106 and provide the monitored voltage data to the processor 108 of the controller 104. Further, the DAC 112 may be replaced by a variable controlled voltage source that can supply analog voltage to the base terminal of the transistor 102, upon getting a command from the processor 108 of the controller 104, and all such embodiments are well within the scope of this invention.

In some embodiments, controller 104 may compensate for the effect of temperature on the smoke detector and maintain the supply of a constant predefined current to the light emitter 202 for a predefined temperature such as but not limited to room temperature, so that, regardless of temperature variation around the smoke detector varies, the same constant predefined current can be supplied to the light emitter 202. Initially, during the manufacturing stage, controller 104 monitors the voltage (first base voltage) to be supplied to the base terminal of transistor 102 to enable transistor 102 to supply the predefined current to the light emitter 202. Further, controller 104 determines a voltage (first resistor voltage) across the resistor 106 when the first base voltage is supplied to the base terminal. The determined values of the first base voltage and the first resistor voltage are permanently stored in the memory 110 associated with the controller 104. The above steps are automatically performed by the controller 104 just one time during the manufacturing stage.

Later on, before each smoke detection process, the below temperature compensation steps are periodically and automatically performed by the controller 104. Before each smoke detection process, controller 104 sets a value of the base voltage to be supplied to the base terminal as the first base voltage and correspondingly determines a voltage (second resistor voltage) across the resistor 106. Further, controller 104 compares the first resistor voltage with the second resistor voltage and correspondingly determines a difference between the first resistor voltage and the second resistor voltage. Finally, controller 104 adjusts the voltage supplied to the base terminal based on the determined difference to enable transistor 102 to supply the predefined current to the light emitter 202. Thus, this invention is capable of compensating for the effect of temperature on the driver circuit 100 or smoke detector or device 200 and enables the supply of constant current (current required at room temperature) to the light emitter 202 of the smoke detector or device 200, regardless of the temperature around the smoke detector.

In one example, when the real-time temperature around the smoke detector or device 200 is equal to the predefined (room) temperature, the difference between the first resistor voltage and the second resistor voltage remains zero (i.e, the first resistor voltage and second resistor voltage remain equal), as a result, there is no requirement of adjustment of the light emitter current. In this case, controller 104 adjusts the DAC 112 to supply a base voltage (Vdac) equal to the same first base voltage to the base terminal of transistor 102.

In another example, when the current temperature around the smoke detector or device 200 is lower than the predefined (room) temperature, the difference between the first resistor voltage and the second resistor voltage becomes positive (i.e, the first resistor voltage is greater than the second resistor voltage). In such a case, controller 104 computes a first compensation value (a) that corresponds to the difference between the first resistor voltage and the second resistor voltage, divided by a first correction factor (A) ranging from 0.1 to 16.

$$\alpha = (\text{first resistor voltage} - \text{second resistor voltage})/A$$

Further, controller 104 enables DAC 112 to adjust the base voltage to be supplied to the base terminal to a value equal to the sum of the first base voltage and the first compensation value ($\alpha$).

$$\text{Adjusted base voltage}(Vdac) = (\text{First base voltage} + \alpha)$$

This adjusted base voltage (Vdac) is then supplied by the DAC 112 to the base terminal of transistor 102 to enable transistor 102 to supply the same constant predefined current to the light emitter 202, thereby maintaining a constant count of photons supplied by the light emitter 202 in the smoke detector, regardless of the lowering of temperature around the smoke detector than the predefined (room) temperature.

In yet another example, when the current temperature around the smoke detector or device 200 is greater than the predefined (room) temperature, the difference between the first resistor voltage and the second resistor voltage is negative (i.e, the first resistor voltage is less than the second resistor voltage). In such a case, controller 104 computes a second compensation value (β) that corresponds to the difference between the second resistor voltage and the first resistor voltage, divided by a second correction factor (B) ranging from 0.1 to 16.

$$\beta = (\text{second resistor voltage} - \text{first resistor voltage})/B$$

Further, controller 104 enables DAC 112 to adjust the base voltage to be supplied to the base terminal, to a value equal to a difference between the first base voltage and the second compensation value (β).

$$\text{Adjusted base voltage}(Vdac) = (\text{First voltage} - \beta)$$

This adjusted base voltage (Vdac) is then supplied by the DAC 112 of controller 104 to the base terminal of transistor 102 to enable transistor 102 to supply the same constant predefined current to the light emitter 202, thereby maintaining a constant count of photons supplied by the light emitter 202 in the smoke detector, regardless of the increase in temperature around the smoke detector than the room temperature.

Figure 7:
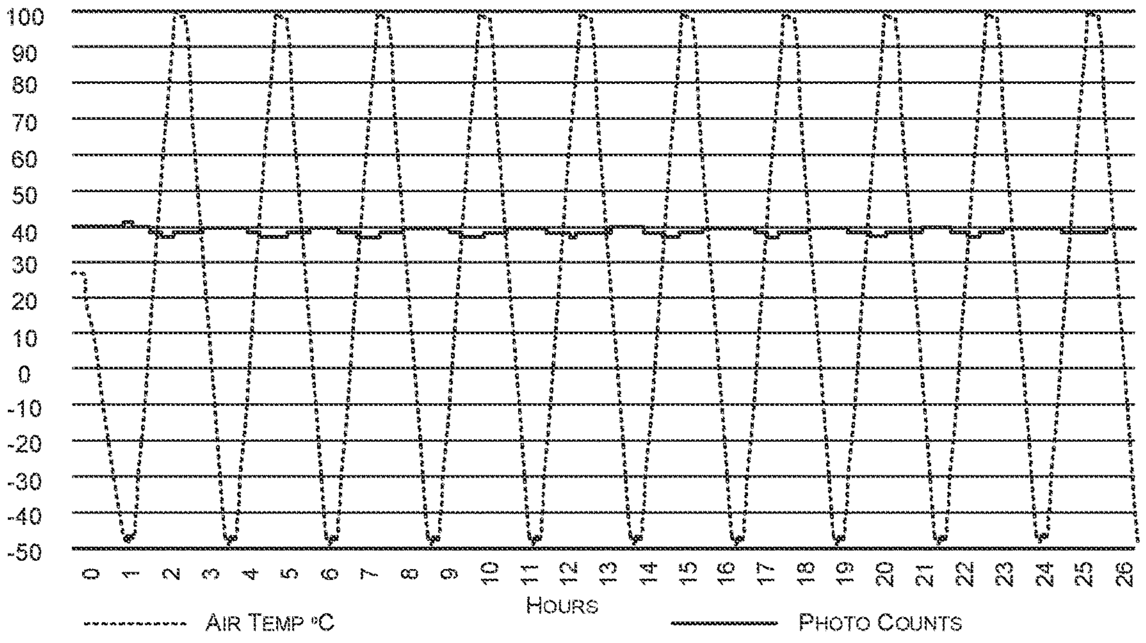
FIG. 7 is a schematic diagram illustrating the effect of temperature on light photon count in the smoke detector or device of this invention, in accordance with one or more embodiments.

Referring to FIG. 7, the effect of temperature on light photon count in the smoke detector or device 200 is illustrated. As can be inferred from FIG. 6 and FIG. 7, the light emitter 202 provides a constant count of the photons in the device 200 throughout 24 hours of the day, regardless of the temperature around the smoke detector or device 200, unlike the existing smoke detector which generates a fluctuating count of photon due to variation of the temperature.

Figure 3:
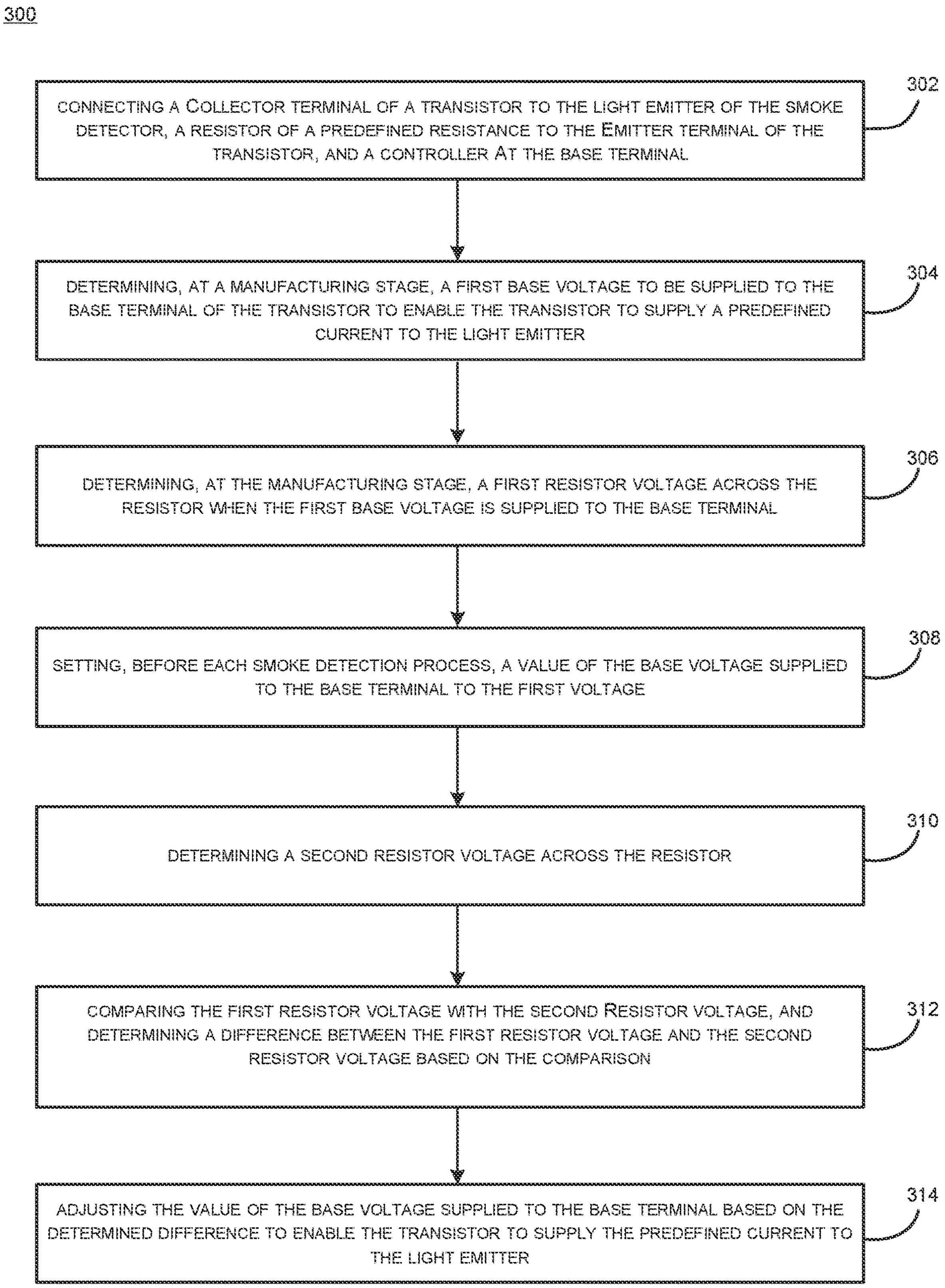
FIG. 3 is a flow diagram illustrating an exemplary method for supplying a constant current to the light emitter of a smoke detector in accordance with one or more embodiments.
Figure 4:
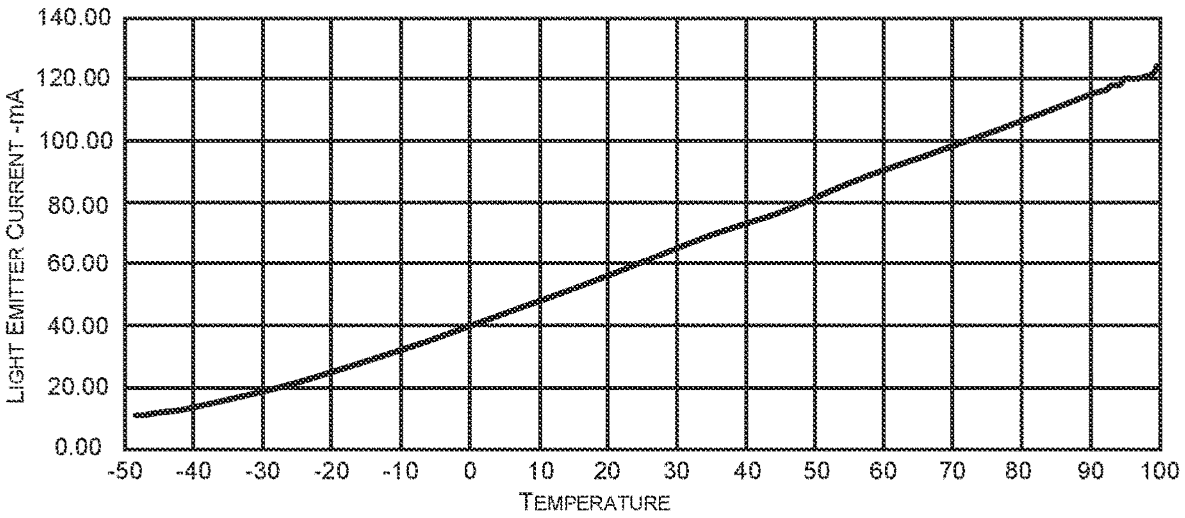
FIG. 4 is a schematic diagram illustrating the effect of temperature on the light emitter current, in accordance with one or more embodiments.

Referring to FIG. 3, exemplary steps involved in method 300 for supplying a constant current to the light emitter of a smoke detector/device, regardless of the temperature around the smoke detector are disclosed. Method 300 includes step 302 of connecting an emitter terminal of a transistor to the light emitter of the smoke detector, a resistor of a predefined resistance to the collector terminal of the transistor, and a controller at the base terminal. Further, at the manufacturing stage, method 300 includes step 304 of determining a voltage (first base voltage) to be supplied to the base terminal of the transistor to enable the transistor to supply a predefined current to the light emitter, followed by another step 306 of determining a voltage (first resistor voltage) across the resistor when the first base voltage is supplied to the base terminal. Further, before each smoke detection process, method 300 includes step 308 of setting a value of the base voltage to be supplied to the base terminal to the first voltage, followed by step 310 of determining a voltage (second resistor voltage) across the resistor. Further, method 300 includes step 312 of comparing the first resistor voltage with the second resistor voltage and determining a difference between the first resistor voltage with the second resistor voltage. Accordingly, based on the determined difference, method 300 includes step 314 of adjusting the value of the base voltage to be supplied to the base terminal based on the determined difference to enable the transistor to supply the predefined current to the light emitter.

In one example, when the difference between the first resistor voltage and the second resistor voltage is zero, method 300 comprises the step of supplying the first base voltage to the base terminal of the transistor. Further, in another example, when the difference between the first resistor voltage and the second resistor voltage is positive, method 300 includes the step of computing, by the controller, a first compensation value that corresponds to the difference between the first resistor voltage and the second resistor voltage, divided by a first correction factor (A) ranging from 0.1 to 16, followed by another step of adjusting the base voltage to be supplied to the base terminal to a value equal to a sum of the first base voltage and the first compensation value (A), and supplying the adjusted voltage to the base terminal.

Furthermore, in yet another example, when the difference between the first resistor voltage and the second resistor voltage is negative, method 300 includes the step of computing, by the controller, a second compensation value that corresponds to the difference between the second resistor voltage and the first resistor voltage, divided by a second correction factor (B) ranging from 0.1 to 16, followed by another step of adjusting the base voltage to be supplied to the base terminal to a value equal to a difference between the first base voltage and the second compensation value (B), and supplying the adjusted voltage to the base terminal.

Thus, this invention overcomes the drawback, shortcomings, and limitations associated with existing smoke detectors by compensating for the effect of temperature on the driver circuit and enabling the driver circuit to supply constant current to the light emitter or constant count of the photons in the smoke detector, regardless of the temperature around the smoke detector.

While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A driver circuit for a light emitter of a smoke detector, the driver circuit comprising:

a transistor comprising a base terminal, a collector terminal, and an emitter terminal, wherein the collector terminal of the transistor is adapted to be operatively connected to the light emitter of the smoke detector;

a resistor of a predefined resistance configured to be connected to the emitter terminal of the transistor; and a controller operatively configured at the base terminal, wherein the controller is configured to:

determine, at a manufacturing stage of the driver circuit, a first base voltage to be supplied to the base terminal of the transistor to enable the transistor to supply a predefined current to the light emitter;

determine, at the manufacturing stage, a first resistor voltage across the resistor when the first base voltage is supplied to the base terminal;

set, before each smoke detection process, a value of the base voltage supplied to the base terminal to the first base voltage;

determine a second resistor voltage across the resistor;

compare the first resistor voltage with the second resistor voltage;

determine a difference between the first resistor voltage and the second resistor voltage based on the comparison; and adjust the value of the base voltage supplied to the base terminal based on the determined difference to enable the transistor to supply the predefined current to the light emitter;

wherein when the difference between the first resistor voltage and the second resistor voltage is positive, the controller is configured to:

compute a first compensation value that corresponds to the difference between the first resistor voltage and the second resistor voltage, divided by a first correction factor ranging from 0.1 to 16;

adjust the base voltage to be supplied to the base terminal to a value equal to a sum of the first base voltage and the first compensation value; and supply the adjusted base voltage to the base terminal.

2. The driver circuit of claim 1, wherein the predefined current corresponds to a constant current to be supplied to the light emitter at a predefined temperature.

3. The driver circuit of claim 1, wherein the predefined temperature is room temperature.

4. The driver circuit of claim 1, wherein the transistor is a Darlington pair transistor or single transistor.

5. The driver circuit of claim 1, wherein, based on one or more of the second resistor voltage across the resistor, the adjusted base voltage to be supplied to the base terminal to supply the predefined current to the light emitter, and the predefined resistance of the resistor, the controller is configured to determine a temperature at an area of interest (AOI) where the driver circuit or the smoke detector is installed.

6. The driver circuit of claim 1, wherein the controller of the driver circuit is a computing unit of the smoke detector, wherein the smoke detector comprises the light emitter and a light receiver.

7. The driver circuit of claim 1, wherein the controller of the driver circuit is different from a computing unit of the smoke detector, wherein the controller of the driver circuit is in communication with a computing unit of the smoke detector.

8. The driver circuit of claim 1, wherein the controller comprises:

an analog to digital converter (ADC) to monitor voltage across the resistor; and a digital to analog converter (DAC) to supply an analog voltage to the base terminal of the transistor.

9. The driver circuit of claim 1, wherein the controller comprises:

a processor; and a memory coupled to the processor and configured to store the values of the first voltage and the second voltage.

10. The driver circuit of claim 1, wherein when the difference between the first resistor voltage and the second resistor voltage is negative, the controller is configured to:

compute a second compensation value that corresponds to the difference between the second resistor voltage and the first resistor voltage, divided by a second correction factor ranging from 0.1 to 16;

adjust the base voltage to be supplied to the base terminal to a value equal to a difference between the first base voltage and the second compensation value; and supply the adjusted base voltage to the base terminal.

11. A smoke detection and alarm device comprising:

a light emitter;

a light receiver;

a driver circuit comprising a transistor having a base terminal, a collector terminal, and an emitter terminal, wherein the collector terminal of the transistor is operatively connected to the light emitter of the smoke detector;

a resistor of a predefined resistance configured to be connected to the emitter terminal of the transistor; and a controller operatively configured at the base terminal, wherein the controller is configured to:

set, before each individual smoke detection process, a base voltage supplied to the base terminal to a predetermined base voltage value;

determine a resistor voltage across the resistor;

compare the determined resistor voltage to a predetermined resistor voltage value; and adjust the base voltage supplied to the base terminal based on the comparison;

wherein the predetermined base voltage value is configured to enable the transistor to supply a constant current to the light emitter at room temperature, and wherein the predetermined resistor voltage is voltage across the resistor when the predetermined base voltage value is supplied to the base terminal.

12. The device of claim 11, wherein the controller comprises:

an analog to digital converter (ADC) to monitor voltage across the resistor; and a digital to analog converter (DAC) to supply an analog voltage to the base terminal of the transistor.

13. The device of claim 11, wherein the light emitter and the light receiver are enclosed within a hollow enclosure having a smoke chamber that is adapted to receive smoke therewithin.

14. The device of claim 13, wherein the controller is configured to:

enable the transistor to supply the predefined current to the light emitter to enable the light emitter to emit photons within the smoke chamber;

detect smoke within the smoke chamber based on a count of photons received by the light receiver upon getting reflected from particles of the smoke within the smoke chamber.

15. The device of claim 14, wherein the controller is configured to generate alarm signals when the count of reflected photons within the smoke chamber exceeds a predefined value.

16. The device of claim 11, wherein the device is adapted to be installed in one or more areas of interest (AOI)

comprising one or more of an HVAC duct, room, hall, staircase, vehicle interior, and storage space.

17. A method for supplying a constant current to a light emitter of a smoke detector, the method comprising:

connecting a collector terminal of a transistor to the light emitter of the smoke detector, a resistor of a predefined resistance to an emitter terminal of the transistor, and a controller at the base terminal;

determining, at a manufacturing stage, a first base voltage to be supplied to the base terminal of the transistor to enable the transistor to supply a predefined current to the light emitter;

determining, at the manufacturing stage, a first resistor voltage across the resistor when the first base voltage is supplied to the base terminal;

setting, before each smoke detection process, a value of the base voltage supplied to the base terminal to the first voltage;

determining a second resistor voltage across the resistor;

comparing the first resistor voltage with the second voltage;

determining a difference between the first resistor voltage and the second resistor voltage based on the comparison; and adjusting the value of the base voltage supplied to the base terminal based on the determined difference to enable the transistor to supply the predefined current to the light emitter;

wherein when the difference between the first resistor voltage and the second resistor voltage is negative, the method comprises:

computing, by the controller, a second compensation value that corresponds to the difference between the second resistor voltage and the first resistor voltage, divided by a second correction factor ranging from 0.1 to 16;

adjusting the base voltage to be supplied to the base terminal to a value equal to a difference between the first base voltage and the second compensation value; and supplying, by the controller, the adjusted base voltage to the base terminal.

18. The method of claim 17, wherein the method comprises determining a temperature at an area of interest (AOI) where the driver circuit or the smoke detector is installed, based on one or more of the second resistor voltage across the resistor, the adjusted base voltage to be supplied to the base terminal to supply the predefined current to the light emitter, and the predefined resistance of the resistor.

19. The method of claim 17, wherein when the difference between the first resistor voltage and the second resistor voltage is zero, the method comprises supplying the first base voltage to the base terminal of the transistor.

20. The method of claim 17, wherein when the difference between the first resistor voltage and the second resistor voltage is positive, the method comprises:

computing, by the controller, a first compensation value that corresponds to the difference between the first resistor voltage and the second resistor voltage, divided by a first correction factor ranging from 0.1 to 16;

adjusting, by the controller, the base voltage to be supplied to the base terminal to a value equal to a sum of the first base voltage and the first compensation value; and supplying, by the controller, the adjusted base voltage to the base terminal.

* * * * *